US012718971B2

(12) United States Patent
Yamamoto et al.

(10) Patent No.: US 12,718,971 B2
(45) Date of Patent: Aug. 25, 2026

(54) CABLE CONNECTION STRUCTURE AND METHOD FOR MANUFACTURING CABLE CONNECTION STRUCTURE

(71) Applicant: Proterial, Ltd., Tokyo (JP)

(72) Inventors: Yuki Yamamoto, Tokyo (JP); Koki Hirano, Tokyo (JP)

(73) Assignee: Proterial, Ltd., Tokyo (JP)

( * ) Notice: Subject to any disclaimer, the term of this patent is extended or adjusted under 35 U.S.C. 154(b) by 278 days.

(21) Appl. No.: 18/447,413

(22) Filed: Aug. 10, 2023

(65) Prior Publication Data

US 2024/0087771 A1 Mar. 14, 2024

(30) Foreign Application Priority Data

Sep. 9, 2022 (JP) ................................ 2022-143507

(51) Int. Cl.

| | |
|---|---|
| ***H01B 7/18*** | (2006.01) |
| ***A61B 1/00*** | (2006.01) |
| ***A61B 1/05*** | (2006.01) |
| ***A61B 1/07*** | (2006.01) |
| ***B23K 1/00*** | (2006.01) |

(Continued)

(52) U.S. Cl.

CPC ......... *H01B 7/1875* (2013.01); *H01B 7/0225* (2013.01); *H01R 4/723* (2013.01)

(58) Field of Classification Search

CPC ................ H01B 7/1875; H01B 7/0225; B23K 2101/32; B23K 2101/38; B23K 1/0016; B23K 1/012; A61B 1/0011; A61B 1/00124; A61B 1/07; A61B 1/051; H01R 4/024; H01R 43/28

See application file for complete search history.

(56) References Cited

U.S. PATENT DOCUMENTS 10,757,302 B2 8/2020 Usuda et al.
10,806,333 B2 10/2020 Sato (Continued)

FOREIGN PATENT DOCUMENTS

JP H10-302854 A 11/1998
JP 2019-047300 A 3/2019

(Continued)

OTHER PUBLICATIONS

An Office Action, "Notice of Reasons for Refusal," mailed by the Japanese Patent Office on Dec. 23, 2025, which corresponds to Japanese Patent Application No. 2022-143507 and is related to U.S. Appl. No. 18/447,413; with English language translation.

*Primary Examiner* — Timothy J Thompson
*Assistant Examiner* — Amol H Patel
(74) *Attorney, Agent, or Firm* — Studebaker Brackett PLLC

(57) ABSTRACT

A cable connection structure is provided with a cable having a plurality of electric wires including core wires made of metal conductors coated with insulators, respectively, and a sheath covering the plurality of electric wires, and an electronic component including a plurality of electrodes. In the cable, the core wires and the insulators of the plurality of electric wires and the sheath are collectively cut perpendicularly to a longitudinal direction at an end of the cable, and tip portions of the core wires including cutting edges of the core wires of the plurality of electric wires are soldered to the plurality of electrodes, respectively.

5 Claims, 9 Drawing Sheets

(51) Int. Cl.

| | |
|---|---|
| ***B23K 1/012*** | (2006.01) |
| ***B23K 101/32*** | (2006.01) |
| ***B23K 101/38*** | (2006.01) |
| ***H01B 7/02*** | (2006.01) |
| ***H01R 4/02*** | (2006.01) |
| ***H01R 4/72*** | (2006.01) |
| ***H01R 43/28*** | (2006.01) |

(56) References Cited

U.S. PATENT DOCUMENTS

| | | | | |
|---|---|---|---|---|
| 2013/0064530 | A1* | 3/2013 | Sekido ............... | A61B 1/00124 396/17 |
| 2019/0068848 | A1 | 2/2019 | Usuda et al. | |
| 2019/0343375 | A1 | 11/2019 | Sato | |
| 2020/0029791 | A1* | 1/2020 | Satake ................... | A61B 1/051 |
| 2022/0102030 | A1* | 3/2022 | Nabeta ............... | H01B 13/0023 |
| 2022/0319960 | A1 | 10/2022 | Takahashi et al. | |

FOREIGN PATENT DOCUMENTS

| | | | |
|---|---|---|---|
| JP | 2019-195450 | A | 11/2019 |
| JP | 2021-057990 | A | 4/2021 |
| JP | 6996648 | B1 | 12/2021 |

* cited by examiner

CABLE CONNECTION STRUCTURE AND METHOD FOR MANUFACTURING CABLE CONNECTION STRUCTURE

CROSS-REFERENCE TO RELATED APPLICATIONS

The present patent application claims the priority of Japanese patent application No. 2022-143507 filed on Sep. 9, 2022, and the entire contents thereof are hereby incorporated by reference.

TECHNICAL FIELD

The present invention relates to a cable connection structure in which a cable is connected to an electronic component, and a manufacturing method thereof.

BACKGROUND OF THE INVENTION

Conventionally, an endoscope system used for examination and treatment of hollow organs (luminal organs) and blood vessels, for example, includes an imaging device such as a CCD (Charge Coupled Device) camera, an image processing device for displaying the captured image on a display, and a cable connecting the imaging device and the image processing device.

The imaging module described in Patent Literature 1 includes an imaging element having a plurality of electrodes, a signal cable having a plurality of conductors, a circuit board having a plurality of connection wirings for connecting the plurality of electrodes of the imaging element and the plurality of conductors of the signal cable, and a fixing member for fixing the signal cable to the circuit board.

The imaging unit described in Patent Literature 2 includes an imaging element having a plurality of electrode pads, a coaxial cable having an inner conductor and an outer conductor, and a three-dimensional wiring board interposed between the imaging element and the coaxial cable. The three-dimensional wiring board includes an inner conductor connection pad to which the inner conductor of the coaxial cable is connected, an outer conductor connection pad to which the outer conductor of the coaxial cable is connected, a plurality of element connection pads each connected to a plurality of electrode pads of the imaging element, and a plurality of inter-pad connection wirings that electrically connect these pads.

The cable connection structure described in Patent Literature 3 includes an imaging device in which a plurality of electrodes are formed on an electrode-forming surface of an imaging element, a cable in which a plurality of electric wires are led out from an outer covering (jacket) over a predetermined length, and an embedded member formed by curing a resin filled around the plurality of electric wires that are led out from the outer covering. Core wires of the plurality of electric wires are respectively soldered to the plurality of electrodes of the imaging device.

CITATION LIST

Patent Literature 1: JP2019-47300A
Patent Literature 2: JP2019-195450A
Patent Literature 3: Japanese Patent No. 6996648

SUMMARY OF THE INVENTION

In the imaging module of Patent Literature 1, the circuit board and the fixing member are interposed between the imaging element and the signal cable, and in the imaging unit of Patent Literature 2, the three-dimensional wiring board is interposed between the imaging element and the coaxial cable. These components increase the parts cost and also increase the wiring cost. In addition, in the device described in Patent Literature 3, the parts cost and wiring cost can be reduced compared to the devices described in Patent Literatures 1 and 2. However, in a part where the embedded member is provided, the plurality of electric wires are difficult to bend, and the flexibility of the cable is reduced.

Accordingly, an object of the present invention is to provide a cable connection structure that can be reduced in cost and has excellent flexibility, and a method for manufacturing the cable connection structure.

In order to solve the above-mentioned problems, the present invention provides a cable connection structure, comprising: a cable comprising a plurality of electric wires comprising core wires composed of metal conductors coated with insulators, respectively, and a sheath covering the plurality of electric wires; and an electronic component including a plurality of electrodes, wherein, in the cable, the core wires and the insulators of the plurality of electric wires and the sheath are collectively cut perpendicularly to a longitudinal direction at an end of the cable, and tip portions of the core wires including cutting edges of the core wires of the plurality of electric wires are soldered to the plurality of electrodes, respectively.

Further, in order to solve the above problems, the present invention provides a method of manufacturing a cable connection structure comprising a cable including a plurality of electric wires comprising core wires composed of metal conductors coated with insulators, respectively, and a sheath covering the plurality of electric wires, and an electronic component comprising a plurality of electrodes, the method comprising: collectively cutting the core wires and the insulators of the plurality of electric wires and the sheath together perpendicularly to a longitudinal direction of the cable; and connecting tip portions of the core wires including cutting edges of the core wires of the plurality of electric wires to the plurality of electrodes, respectively in a state where a cutting edge of the cable faces a surface formed with the plurality of electrodes of the electronic component.

Effect of the Invention

According to the present invention, it is possible to provide a cable connection structure that can be reduced in cost and has excellent flexibility, and a method for manufacturing the cable connection structure.

DETAILED DESCRIPTION OF THE INVENTION

First Embodiment

Figure 1A:
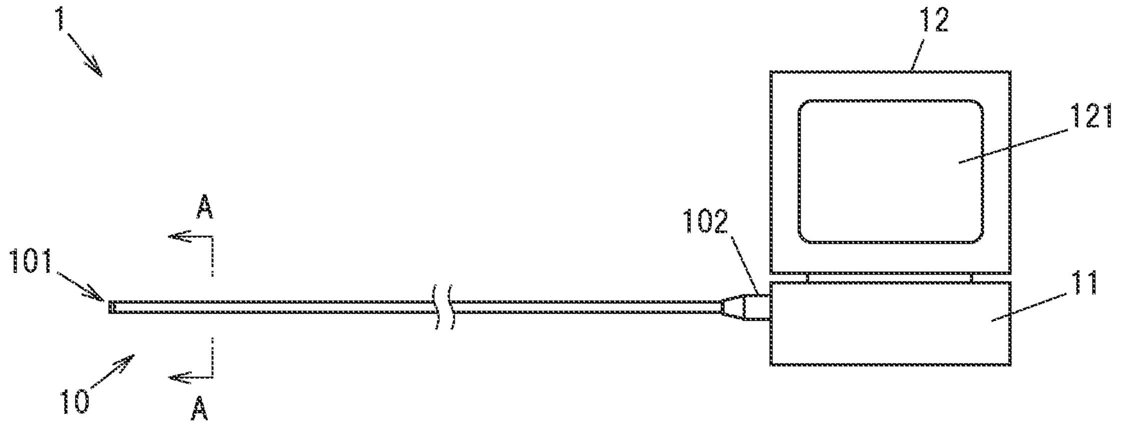
FIG. 1A is a system configuration diagram of an endoscope system including an endoscope using an imaging device with a cable according to a first embodiment of the present invention.
Figure 1B:
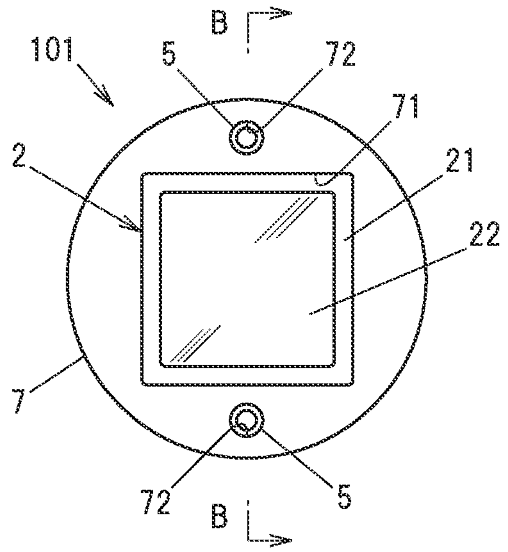
FIG. 1B is an end surface view showing an insertion end of the endoscope.
Figure 1C:
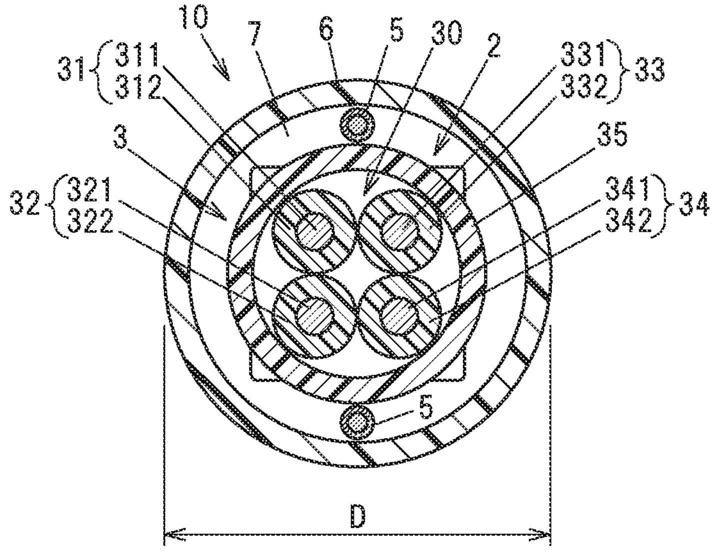
FIG. 1C is a cross-sectional view taken along a line A-A in FIG. 1A.

FIG. 1A is a system configuration diagram of an endoscope system 1 including an endoscope 10 using an imaging device (i.e., image pickup device) with a cable according to the first embodiment of the present invention. FIG. 1B is an end surface view showing an insertion end 101 of the endoscope 10. FIG. 1C is a cross-sectional view taken along a line A-A of FIG. 1A.

The endoscope system 1 includes the endoscope 10, an image processing device 11 that processes image information obtained by the endoscope 10, and a display 12 that displays an image processed by the image processing device 11 on a screen 121.

The endoscope 10 is configured in such a manner that a portion in the longitudinal direction including an insertion end 101 is inserted into the blood vessel of the human body. A connector 102 detachable from the image processing device 11 is provided at the end of the endoscope 10 opposite to the insertion end 101 in the longitudinal direction. The length of the endoscope 10 is, e.g., 1 m or more and 4 m or less.

Figure 2A:
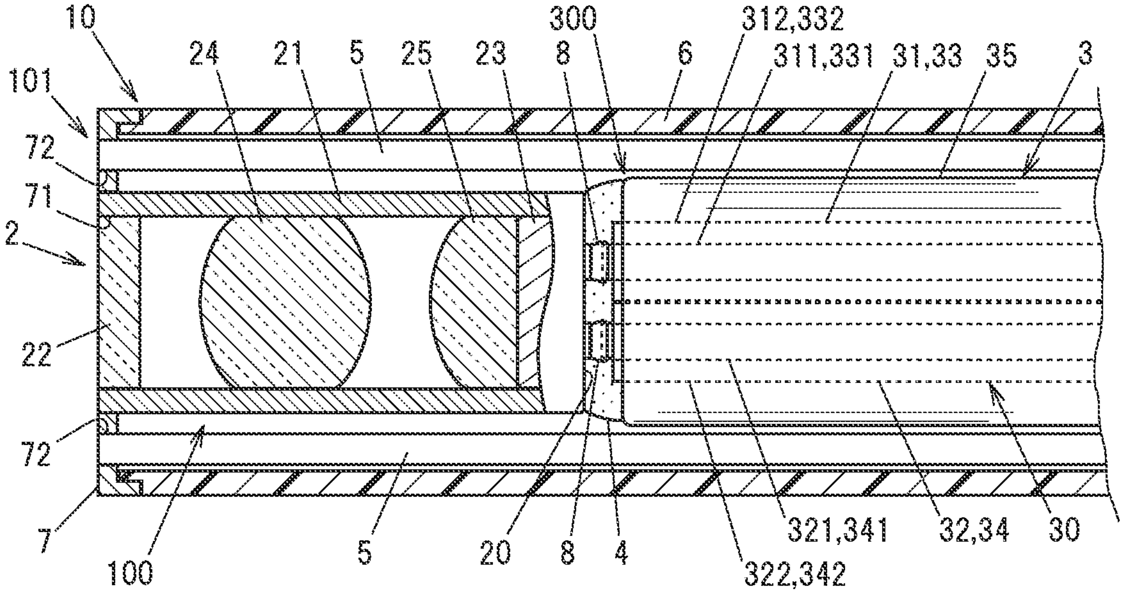
FIG. 2A is a cross-sectional view showing the vicinity of the insertion end of the endoscope taken along a line B-B in FIG. 1B.
Figure 2B:
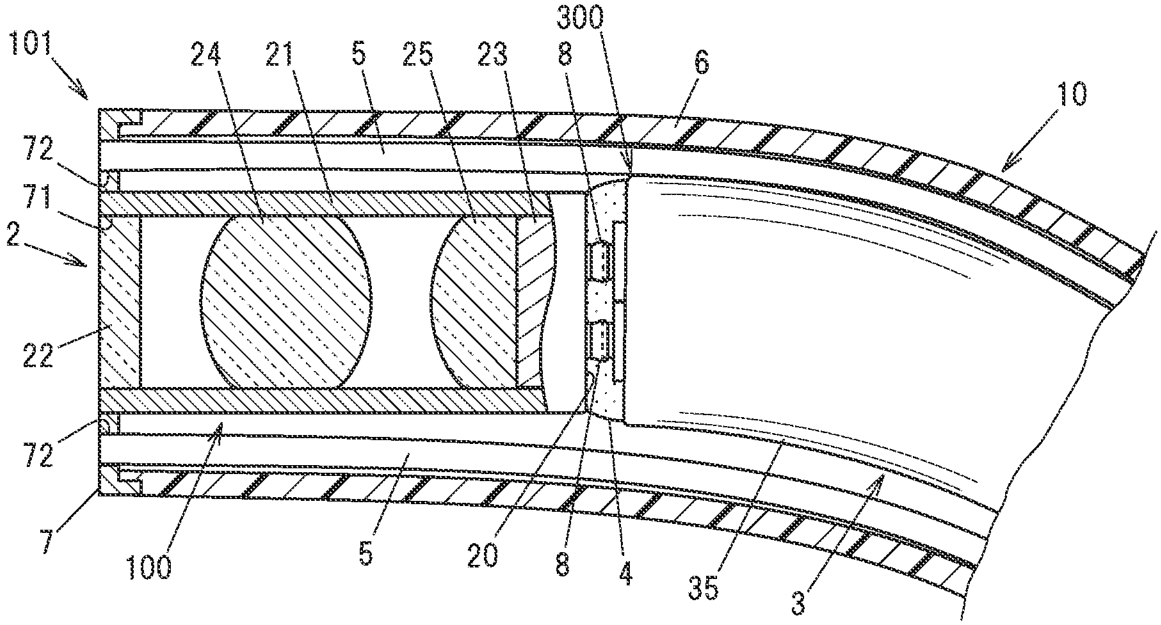
FIG. 2B is a cross-sectional view showing a state in which the endoscope is bent.

FIG. 2A is a cross-sectional view showing the vicinity of the insertion end 101 of the endoscope 10 along a line B-B in FIG. 1B. FIG. 2B is a cross-sectional view showing a state in which the endoscope 10 is bent.

The endoscope 10 includes an imaging device 2, a cable 3, a filler 4 filled between the imaging device 2 and the cable 3, a plurality of optical fibers 5, a tube 6 accommodating these elements, and a cover body 7 that closes a tip opening of the tube 6. The imaging device 2 has a rectangular parallelepiped shape as a whole and is arranged in the tube 6 so that its longitudinal direction is parallel to the longitudinal direction of the tube 6. The tube 6 is made of flexible resin and has an outer diameter of, e.g., 2 mm or less. The imaging device 2, the cable 3, and the filler 4 constitute a cable connection structure 100. The imaging device 2 is one aspect of the electronic component of the present invention.

The cover body 7 is formed with an imaging device through-hole 71 into which the tip end of the imaging device 2 is fitted, and a plurality of optical fiber through-holes 72 into which the tip end portions of the plurality of optical fibers 5 are respectively fitted. In this embodiment, the endoscope 10 has two optical fibers 5, and two optical fiber through-holes 72 are formed in the cover body 7. The illumination light is incident on the optical fiber 5 from the end on the image processing device 11-side, and this illumination light is emitted from the end on the cover body 7-side. The illumination light emitted from the optical fiber 5 illuminates the imaging target of the imaging device 2.

The imaging device 2 includes a rectangular tube-shaped case member 21, a translucent imaging window 22 fixed to one end of the case member 21, and an imaging element 23 fixed to the other end of the case member 21, and a plurality of lenses 24, 25 arranged between the imaging window 22 and the imaging element 23. Specifically, for example, a CMOS image sensor or a CCD image sensor can be used as the imaging element 23. The imaging element 23 converts the information of the optical image formed on its light-receiving surface into an electrical signal and transmits the electrical signal to the image processing device 11 via the cable 3.

The cable 3 is a multicore cable including first to fourth electric wires 31 to 34 and a sheath 35 covering the first to fourth electric wires 31 to 34 collectively. The first to fourth electric wires 31 to 34 are composed of core wires 311, 321, 331, 341 made of metal conductors with high electrical conductivity such as copper alloy, and insulators 312, 322, 322 made of electrically insulating resin. 332, 342. The cable 3 faces the imaging device 2 at its longitudinal end 300.

As the core wires 311, 321, 331, 341, those having a size of, e.g., 33 to 39 AWG (0.0889 mm or more and 0.18034 mm or less in diameter) can be used. "AWG" is the American Wire Gauge standard. In the present embodiment, the core wires 311, 321, 331, 341 are single wires, but the core wires 311, 321, 331, 341 may be twisted wires obtained by twisting a plurality of strands (elementary wires). As the insulators 312, 322, 332, 342 for covering the core wires 311, 321, 331, 341, the insulator made of, e.g., PVC (polyvinyl chloride) can be used.

The sheath 35 is made of an electrically insulating resin and formed into a hollow tube having a circular cross-section. As the resin material of the sheath 35, e.g., a fluorine resin such as PFA (perfluoroalkoxyalkane) can be suitably used. The sheath 35 is formed by extruding melted resin around an outer periphery of a wire bundle 30 consisting of the first to fourth electric wires 31 to 34.

The insulators 312, 322, 332, 342 and the sheath 35 have a heat shrinkable property that shrinks when heated in the connecting step described later. This heat shrinkable property is a property generally possessed by a resin-molded product. For example, the heat shrinkable property of the sheath 35 can be adjusted by the extrusion temperature during extrusion molding, the line speed of the wire bundle 30, and the drawdown ratio. More specifically, the higher the extrusion temperature, line speed, and drawdown ratio, the greater the shrinkage rate.

The first electric wire 31 is, for example, a power line that supplies operating power to the imaging device 2. The second electric wire 32 is, for example, a signal line for transmitting optical image information converted into an electrical signal by the imaging element 23 to the image processing device 11. The third electric wire 33 is a signal line for transmitting a control signal such as a shutter signal from the image processing device 11 to the imaging device 2. The fourth electric wire 34 is an electrically grounded drain wire.

Figure 3A:
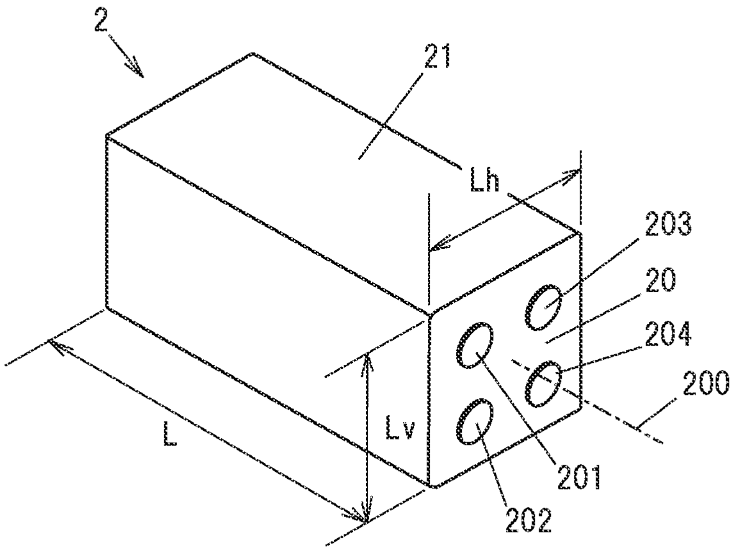
FIG. 3A is a perspective view showing an imaging device.
Figure 3B:
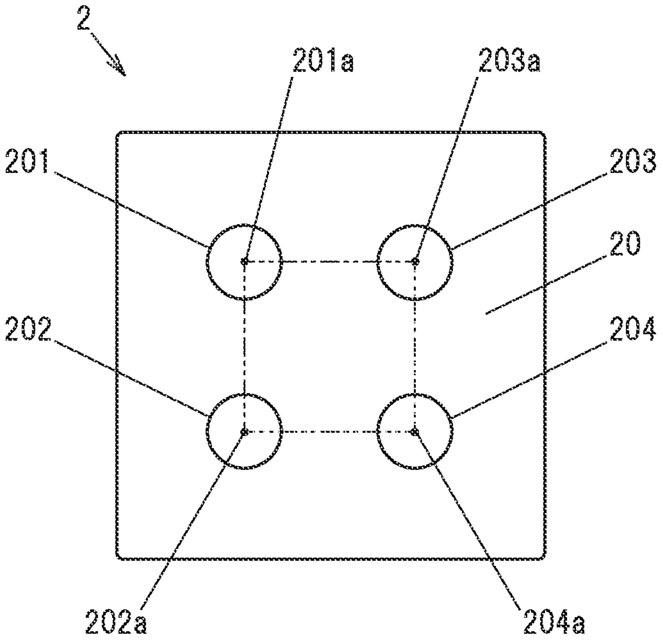
FIG. 3B is a plan view showing an electrode-forming surface of the imaging device.

FIG. 3A is a perspective view showing the imaging device 2. FIG. 3B is a plan view showing the electrode-forming surface 20 of the imaging device 2. The longitudinal length L of the imaging device 2 is, e.g., 1.0 mm or more and 2.0 mm or less. The imaging device 2 has an electrode-forming surface 20 at the end on the cable 3-side in the longitudinal direction. The electrode-forming surface 20 is a facing surface facing the end 300 of the cable 3.

First to fourth electrodes 201 to 204 are formed on the electrode-forming surface 20. The core wire 311 of the first electric wire 31 is connected to the first electrode 201, the core wire 321 of the second electric wire 32 is connected to the second electrode 202, the core wire 331 of the third electric wire 33 is connected to the third electrode 203, and the core wire 341 of the fourth electric wire 34 is connected to the fourth electrode 204, respectively.

In FIG. 3A, the normal line 200 of the electrode-forming surface 20 is indicated by a dashed line. The electrode-forming surface 20 is a rectangular flat surface when viewed along the normal line 200, and the lengths Lh and Lv of respective sides of the surface are equal to or less than the outer diameter D of the sheath 35 (see FIG. 1C). The lengths Lh and Lv of respective sides of the electrode-forming surface 20 are, e.g., 0.6 mm or more and 1.1 mm or less. In the present embodiment, the electrode-forming surface 20 is square with the sides having the same length, but the electrode-forming surface 20 may be rectangular, for example. The outer diameter D of the sheath 35 is, e.g., 1.0 to 1.5 times the lengths Lh and Lv of the respective sides of the electrode-forming surface 20.

When the electrode-forming surface 20 is viewed from the cable 3-side along the normal line 200, the first to fourth electrodes 201 to 204 are arranged in such a manner that line segments connecting center points 201*a*, 202*a*, 203*a*, and 204*a* of the first to fourth electrodes 201 to 204 to the respective sides of the electrode-forming surface 20 in parallel form a quadrangle. Although the first to fourth electrodes 201 to 204 are respectively circular in the example shown in FIG. 3A, the shape of the first to fourth electrodes 201 to 204 is not limited thereto and may be in quadrangular shape.

Figure 4A:
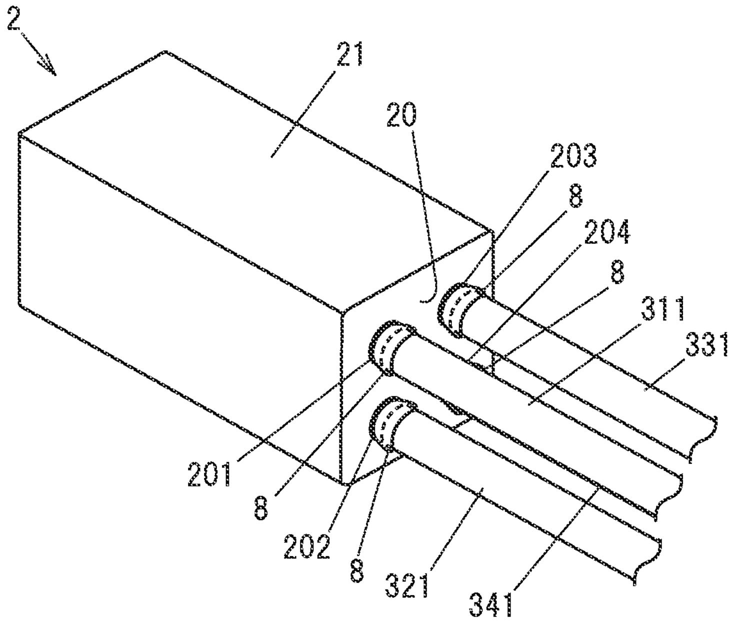
FIG. 4A is a perspective view showing core wires of first to fourth electric wires connected to first to fourth electrodes of the imaging device.
Figure 4B:
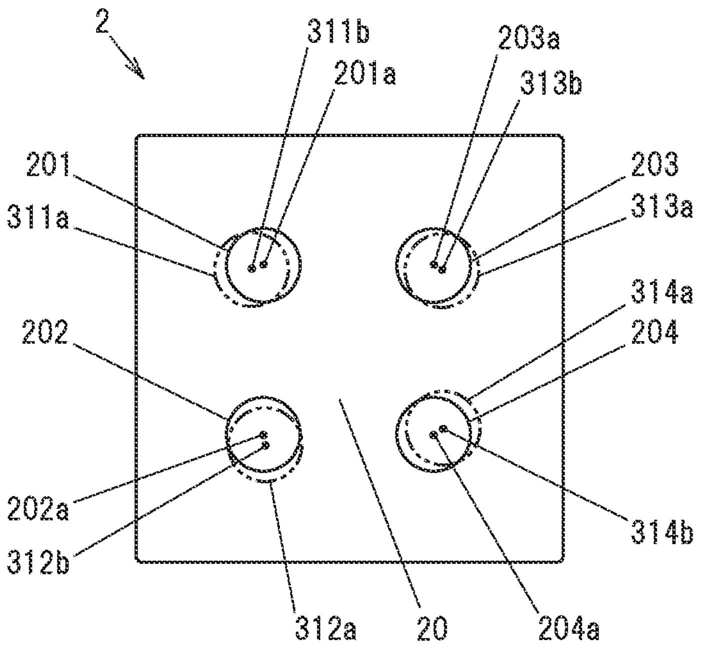
FIG. 4B is an explanatory diagram showing the positional relationship between the core wire and the first to fourth electrodes viewed from a normal direction along a normal line of the electrode-forming surface.

FIG. 4A is a perspective view showing the core wires 311, 321, 331, and 341 of the electric wires 31 to 34 connected to the first to fourth electrodes 201 to 204 of the imaging device 2, in which illustration of the insulators 312, 322, 332, 342 and the sheath 35 of the cable 3 is omitted. FIG. 4B is an explanatory diagram showing the positional relationship between the core wires 311, 321, 331, 341 and the first to fourth electrodes 201 to 204 viewed from the normal direction along the normal line 200 of the electrode-forming surface 20.

In FIG. 4B, outer edges of cross-sections (i.e., cutting edges) 311*a*, 321*a*, 331*a*, and 341*a* of the core wires 311, 321, 331, and 341 are indicated by two-dot chain lines. The cross-sections 311*a*, 321*a*, 331*a*, and 341*a* are tip surfaces of the core wires 311, 321, 331, and 341 on the imaging device 2-side, and are circular.

The core wires 311, 321, 331, 341 of the first to fourth electric wires 31 to 34 are mechanically and electrically connected to the first to fourth electrodes 201 to 204 by solder 8, respectively. The first to fourth electric wires 31 to 34 are not twisted in the sheath 35. When the longitudinal direction of the cable 3 and the longitudinal direction of the imaging device 2 are aligned as shown in FIG. 2A, the first to fourth electric wires 31 to 34 extend parallel to the normal line 200 of the electrode-forming surface 20 without spreading apart from each other at the end portion on the imaging device 2-side.

As shown in FIG. 4B, the cross-sections 311*a*, 321*a*, 331*a*, 341*a* of the core wires 311, 321, 331, 341 of the first to fourth electric wires 31 to 34 and the first to fourth electrodes 201 to 204 are aligned in the normal direction of the electrode-forming surface 20 at least in part. The first to fourth electric wires 31 to 34 are ideally configured in such a manner that the center points 311*b*, 321*b*, 331*b* of the cross-sections 311*a*, 321*a*, 331*a*, 341*a* of the core wires 311, 321, 331, 341 viewed from the normal direction of the electrode-forming surface 20 coincide with the center points 201*a*, 202*a*, 203*a*, 204*a* of the first to fourth electrodes 201 to 204, respectively. As to the positions of the first to fourth electric wires 31 to 34 relative to the fourth electrodes 201 to 204, positional deviations are allowed, for example, within a range in which the positions of the center points 311*b*, 321*b*, 331*b*, 341*b* are inside the outer edges of the first to fourth electrodes 201 to 204.

Next, a method for manufacturing the cable connection structure 100 will be described. The method of manufacturing the cable connection structure 100 includes a cutting step of collectively cutting the core wires 311, 321, 331, 341 and the insulators 312, 322, 332, 342 of the first to fourth electric wires 31 to 34 and the sheath 35 together perpendicularly to the longitudinal direction of the cable 3, a connecting step of connecting the tip portions of the core wires 311, 321, 331, 341 including the cross-sections (i.e., cutting edges) 311*a*, 321*a*, 331*a*, 341*a* of the core wires 311, 321, 331, 341 of the first to fourth electric wires 31 to 34 to the first to fourth electrodes 201 to 204, respectively, and a filling step of filling the filler 4 between the imaging device 2 and the cable 3.

Figure 5A:
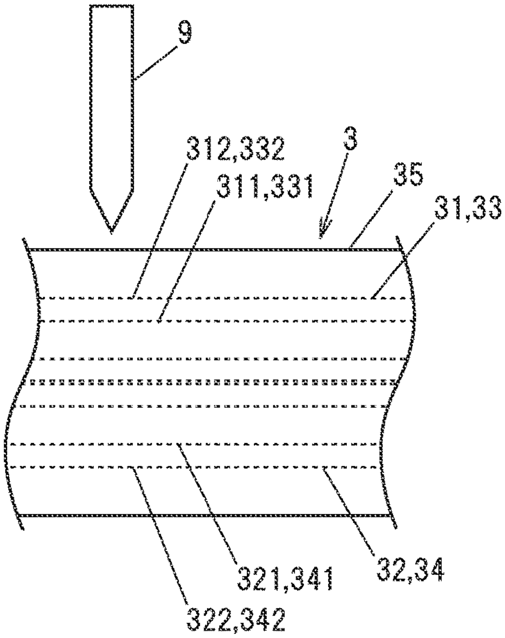
FIGS. 5A and 5B are explanatory diagrams showing a cutting step.
Figure 5B:
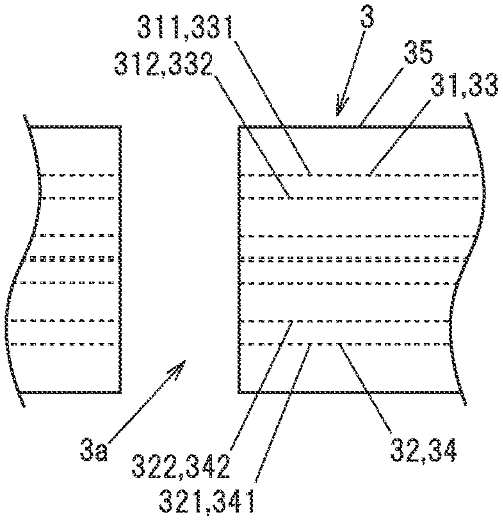

FIGS. 5A and 5B are explanatory diagrams showing the cutting step. In the cutting step, a cutting tool 9 is used to cut the first to fourth electric wires 31 to 34 and the sheath 35 at one point in the longitudinal direction of the cable 3. After cutting the cable 3, a cut surface 3*a* may be polished or ground.

Figure 6A:
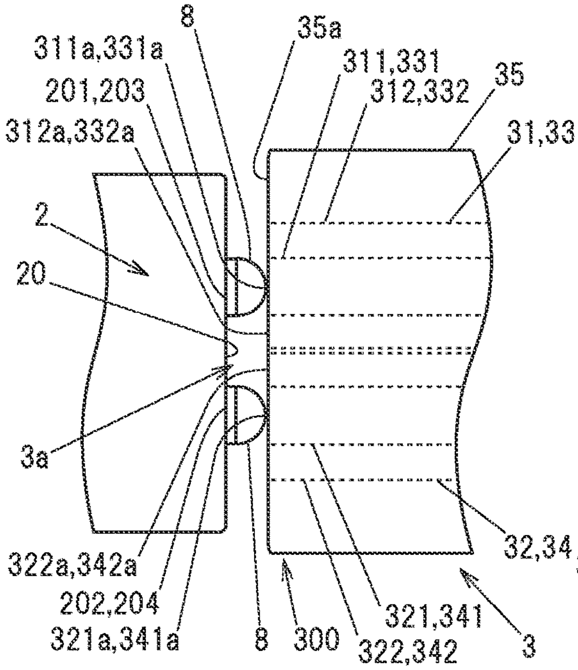
FIGS. 6A and 6B are explanatory diagrams showing a connecting step.
Figure 6B:
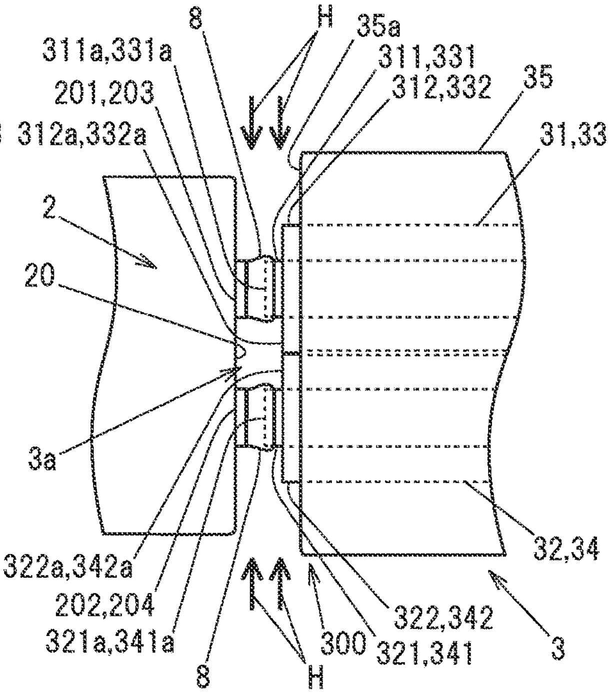

FIGS. 6A and 6B are explanatory diagrams showing the connecting step. The first to fourth electrodes 201 to 204 are preliminarily filled with solder 8 in hemispherical shapes. In the connecting step, as shown in FIG. 6A, the electrode-forming surface 20 of the imaging device 2 and the cut surface (i.e., cutting edge surface) 3*a* of the cable 3 are facing each other, and the cross-sections 311*a*, 321*a*, 331*a*, 341*a* of the core wires 311, 321, 331, 341 are brought into contact with the solder 8 piled up on the first to fourth electrodes 201 to 204, respectively. In this state, the solder 8 is solid.

Thereafter, as shown in FIG. 6B, hot air H is blown to the electrode-forming surface 20 and the end 300 of the cable 3 to melt the solder 8 and perform soldering. The hot air H is, for example, an inert gas such as nitrogen gas, and its temperature is higher than the melting point of the solder 8 and is a temperature that does not melt the insulators 312, 322, 332, 342 and the sheath 35 in the connecting step.

Figure 7:
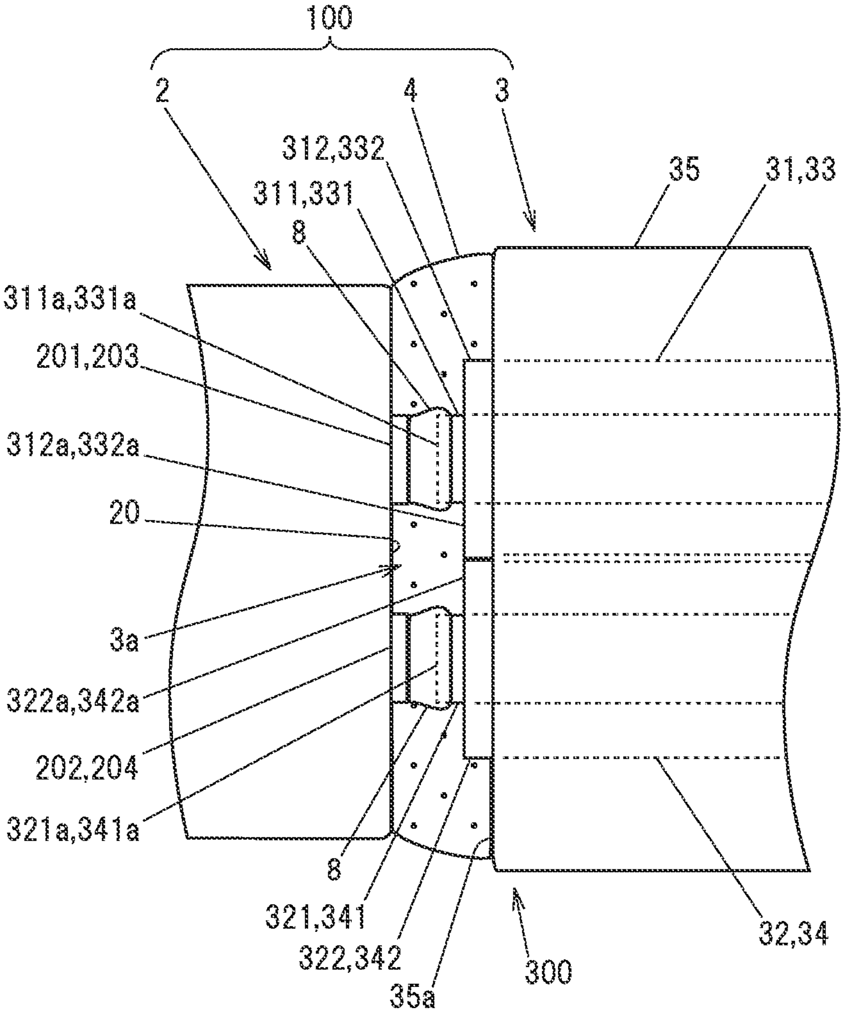
FIG. 7 is an explanatory diagram showing a filling step.

FIG. 7 is an explanatory diagram showing the filling step. In the filling step, after soldering the core wires 311, 321, 331, 341 to the first to fourth electrodes 201 to 204, a gap between the electrode-forming surface 20 of the imaging device 2 and the cable 3 is filled with an adhesive. As this adhesive, e.g., an acrylic adhesive can be used.

Figure 8A:
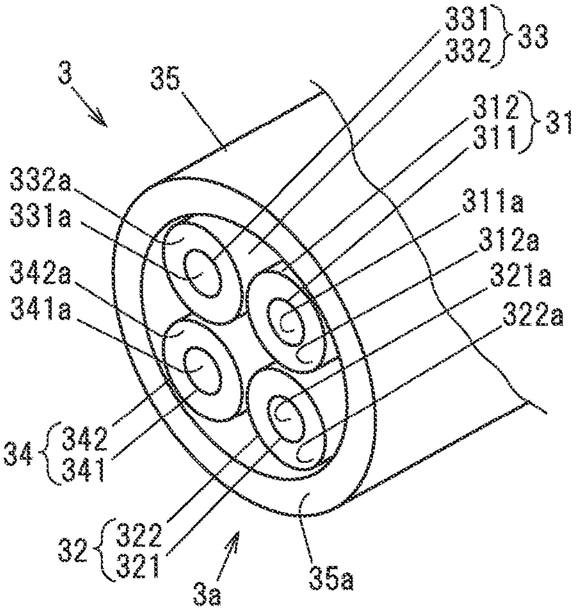
FIGS. 8A and 8B are perspective views showing cross-sections of the cable before and after the connecting step.
Figure 8B:
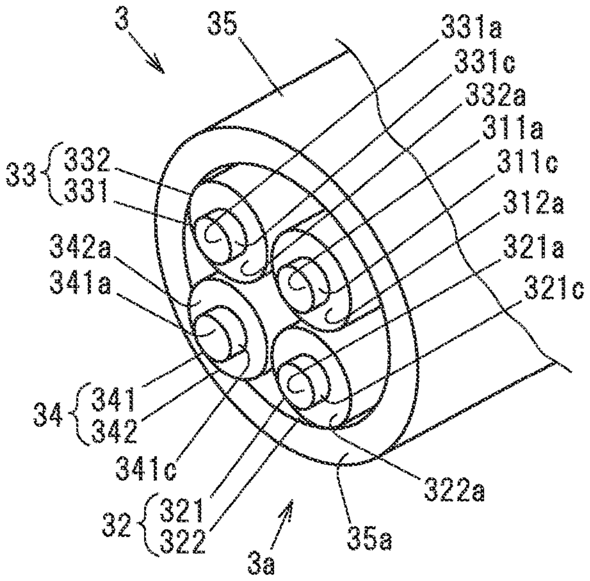

FIGS. 8A and 8B are perspective views showing the cut surface 3*a* of the cable 3 before and after the connecting step. FIG. 8A shows the state before the connecting step, and FIG. 8B shows the state after the connecting step.

In the connecting step, the insulators 312, 322, 332, 342 and the sheath 35 are heated by the hot air H and shrink in the longitudinal direction of the cable 3. As a result, the respective ends of the core wires 311, 321, 331, 341 protrude in the longitudinal direction of the cable 3 toward the electrode-forming surface 20 from the cross-sections 312*a*, 322*a*, 332*a*, 342*a* of the insulators 312, 322, 332, 342 and the cross-section (i.e., cutting edge) 35*a* of the sheath 35 without removing the insulators 312, 322, 332, 342 and the end of the sheath 35 using a tool such as a wire stripper. In other words, after the connecting step, the cross-sections 312*a*, 322*a*, 332*a*, 342*a* of the insulators 312, 322, 332, 342 and the cross-section 35*a* of the sheath 35 are contracted and retracted in the longitudinal direction of the cable 3 with respect to the cross-sections 311*a*, 321*a*, 331*a*, 341*a* of the core wires 311, 321, 331, 341.

By shrinking the insulators 312, 322, 332, 342 and the sheath 35 in this manner, the solder 8 is easily exposed to the hot air H, and the solder 8 is quickly melted. Therefore, the connecting step can be performed in a short time without damaging the imaging element 23 and the like. Moreover, side surfaces 311*c*, 321*c*, 331*c*, 341*c* of the core wires 311, 321, 331, 341 are exposed by the contraction of the insulators 312, 322, 332, 342, so that the solder 8 are adhered to the side surfaces 311*c*, 321*c*, 331*c*, 341*c* as well as the cross-sections 311*a*, 321*a*, 331*a*, 341*a*. This makes it possible to perform soldering with high bonding strength.

In this embodiment, the shrinkage rate of the sheath 35 is greater than the shrinkage rate of the insulators 312, 322, 332, and 342, and as shown in FIGS. 6B and 7, the cross-section 35*a* of the sheath 35 is contracted in the longitudinal direction of the cable 3 to a greater extent than the cross-sections 312*a*, 322*a*, 332*a*, 342*a* of the insulators 312, 322, 332, 342. The present invention is not limited thereto. The contracted length of the sheath 35 may be the same as the contracted length of the insulators 312, 322, 332, 342, or the contracted length of the sheath 35 may be shorter than the contracted length of the insulators 312, 322, 332, 342. Here, if the contracted length of the sheath 35 is longer than the contracted length of the insulators 312, 322, 332, 342, the insulators 312, 322, 332, 342 are exposed to the hot air H, and the insulators 312, 322, 332, 342 are being easily contracted, and the solder 8 is also easily exposed to the hot air H, which is more desirable. The contracted length is the length of the cable 3 in the longitudinal direction that has shrunk due to heat shrinkage in the connecting step.

Function and Effect of the First Embodiment

According to the first embodiment described above, since no other component is interposed between the imaging device 2 and the cable 3, and the respective core wires 311, 321, 331, 341 of the first to fourth electric wires 31 to 34 are directly connected to the first to fourth electrodes 201 to 204 of the imaging device 2, the parts cost and wiring cost can be reduced. Further, as shown in FIG. 2B, the cable 3 can be bent from the vicinity of the cut surface 3*a*, so the flexibility of the endoscope 10 and the cable connection structure 100 can be enhanced.

Second Embodiment

Figure 9A:
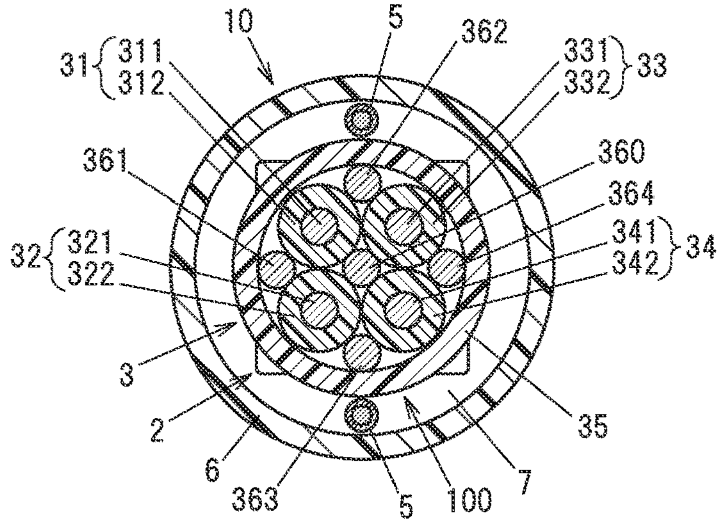
FIG. 9A is a cross-sectional view of an endoscope with a cable according to a second embodiment.
Figure 9B:
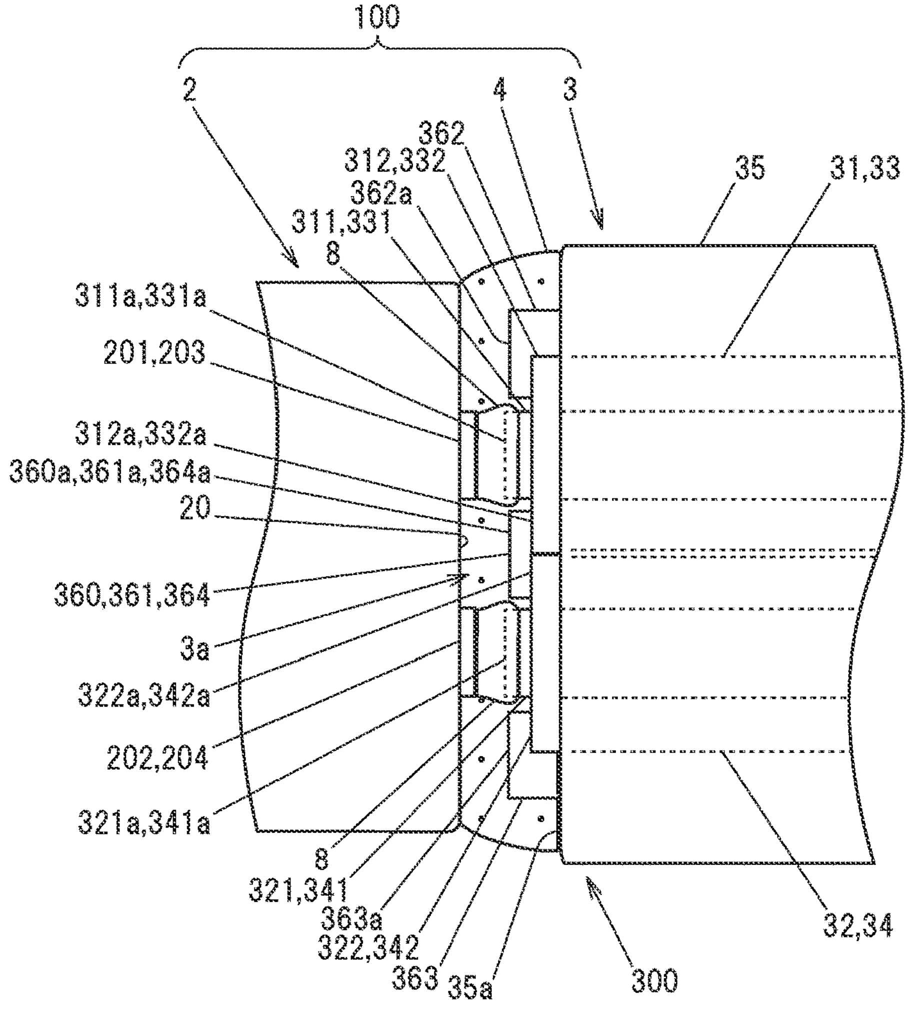
FIG. 9B is a configuration diagram showing a connecting portion between an imaging device and a cable according to a second embodiment.
Figure 10A:
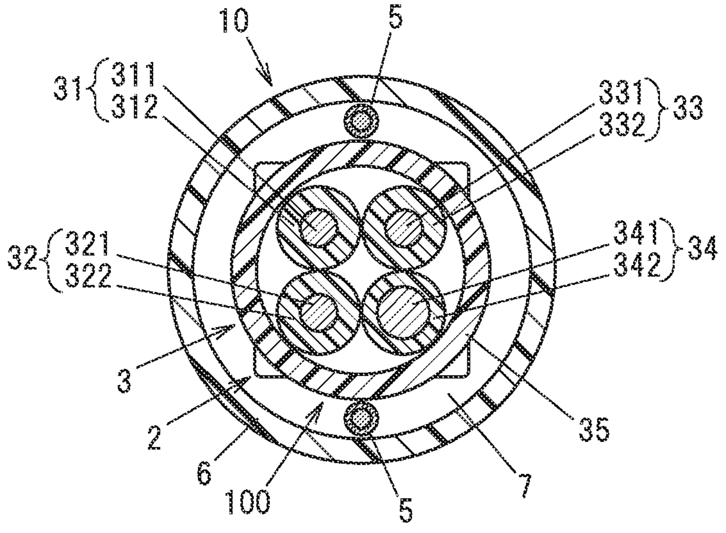
FIG. 10A is a cross-sectional view showing an endoscope with a cable according to a third embodiment.
Figure 10B:
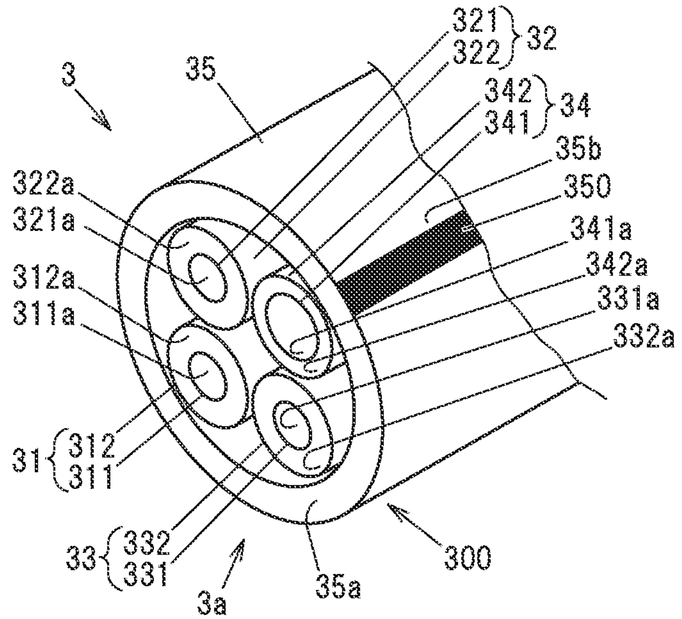
FIG. 10B is a perspective view showing a cross-section of the cable and its peripheral portion according to a third embodiment.

Next, a second embodiment of the present invention will be described with reference to FIGS. 9A and 9B. FIG. 9A is a cross-sectional view of an endoscope 10 having a cable 3 according to the second embodiment. FIG. 10B is a configuration diagram showing a connecting portion between the imaging device 2 and the cable 3.

In this embodiment, the cable 3 has a center filler 360 and first to fourth side fillers 361 to 364 in addition to the first to fourth electric wires 31 to 34. The center filler 360 is arranged in the center portion of the cable 3 surrounded by the first to fourth electric wires 31 to 34. The first side filler 361 is provided between the first and second electric wires 31, 32 and the sheath 35, and the second side filler 362 is provided between the first and third electric wires 31, 33 and the sheath 35, the third side intervening 363 is provided between the second and fourth electric wires 32, 34 and the sheath 35, and the fourth side filler 364 is provided between the third and fourth electric wires 33, 34 and the sheath 35, respectively.

The center filler 360 and the first to fourth side fillers 361 to 364 are cut together with the first to fourth electric wires 31 to 34 and the sheath 35 in the cutting step. In addition, the first to fourth side fillers 361 to 364 are made of resin and have heat shrinkable property, but the shrinkage rate when heated is less than the shrinkage rate of the insulators 312, 322, 332, 342 of the first to fourth electric wires 31 to 34. Therefore, as shown in FIG. 9B, the cross-sections 312*a*, 322*a*, 332*a*, 342*a* of the insulators 312, 322, 332, 342 cut in the cutting step are contracted and retracted in the longitudinal direction of the cable 3 with respect to a cross-section 360*a* (i.e., cutting edge) of the center filler 360 and the first to second cross-sections (i.e., cutting edges) 361*a*, 362*a*, 363*a*, 364*a* of the first to fourth side fillers 361 to 364.

According to this second embodiment, in addition to the effects of the first embodiment, the positions of the first to fourth electric wires 31 to 34 in the sheath 35 are stabilized are prevented by the center filler 360 and the first to fourth side fillers 361 to 364, and the positions of the core wires 311, 321, 331, 341 and the first to fourth electrodes 201 to 204 are easily aligned. In addition, the center filler 360 and the first to fourth side fillers 361 to 364 protrude toward the electrode-forming surface 20 of the imaging device 2 from the cross-sections 312*a*, 322*a*, 332*a*, 342*a* of the insulators 312, 322, 332, 342. Therefore, the center filler 360 and the first to fourth side fillers 361 to 364 can suppress the occurrence of solder bridges in which the solders 8 are short-circuited.

Note that any one of the center filler 360 and the first to fourth side fillers 361 to 364 may be omitted. For example, the first to fourth side fillers 361 to 364 may be omitted, or the center filler 360 may be omitted. Even in these cases, the positions of the first to fourth electric wires 31 to 34 are more stable than in the first embodiment.

Third Embodiment

Next, a third embodiment of the present invention will be described with reference to FIGS. 10A and 10B. FIG. 10A is a cross-sectional view showing an endoscope 10 having a cable 3 according to the third embodiment. FIG. 10 B is a perspective view showing a cut surface 3*a* of the cable 3 and its peripheral portion.

In the first embodiment, the core wires 311, 321, 331, 341 of the first to fourth electric wires 31 to 34 have the same size (diameter). Among the first to fourth electric wires 31 to 34, the size of the core wire 341 of the electrically grounded fourth electric wire 34 is greater than the size of the core wires 311, 321, 331 of the other first to third electric wires 31 to 33. Note that the first to fourth electric wires 31 to 34 are not twisted together as in the first embodiment and extend parallel to the longitudinal direction of the cable 3.

Further, in the present embodiment, when connecting the cable 3 to the imaging device 2, the first to fourth electric wires 31 to 34 are easily aligned with the first to fourth electrodes 201 to 204. An index 350 indicating the position of the fourth electric wire 34 is attached to a part in the circumferential direction of an outer peripheral surface 35*b* of the sheath 35 corresponding to the outer peripheral side of the fourth electric wire 34.

FIG. 10B shows the case where the index 350 is a straight line extending along the longitudinal direction of the cable 3, but it is not limited thereto and may be, for example, a dotted line or a double line. Also, for example, a series of characters indicating the manufacturer name or model name of the cable 3 may be used as an index indicating the position of the fourth electric wire 34. Furthermore, the position of the index 350 on the outer peripheral surface 35*b* of the sheath 35 does not have to be the position corresponding to the outer peripheral side of the fourth electric wire 34 as long as the relative position with respect to the fourth electric wire 34 is predetermined.

When connecting the cable 3 to the imaging device 2, the cable 3 is aligned with the imaging device 2 using the index 350 as a mark in the connecting step. The cross-sectional area of the core wire 341 of the fourth electric wire 34 is, e.g., 1.5 times or more the cross-sectional area of the core wires 311, 321, 331 of the first to third electric wires 31 to 33. In FIG. 10B, as an example, the case where the cross-sectional area of the core wire 341 of the fourth electric wire 34 is twice or more the cross-sectional area of the core wires 311, 321, 331 of the first to third electric wires 31 to 33 is shown.

Summary of Embodiment

Next, the technical ideas grasped from the first to third embodiments described above will be described with reference to the reference numerals and the like in the first to third embodiments. However, each reference numeral in the following description does not limit the constituent elements in the claims to the members and the like specifically shown in the embodiment.

According to the first feature, a cable connection structure includes a cable 3 including a plurality of electric wires 31 to 34 including core wires 311, 321, 331, 341 made of metal conductors are coated with insulators 312, 322, 332, 342, respectively, and a sheath 35 covering the plurality of electric wires 31 to 34, and an electronic component (imaging device) 2 having a plurality of electrodes 201 to 204, wherein, in the cable 3, the core wires 311, 321, 331, 341 and the insulators 312, 322, 332, 342 of the plurality of electric wires 31 to 34 and the sheath 35 are collectively cut perpendicularly to a longitudinal direction at an end 300 of the cable 3, and tip portions of the core wires 311, 321, 331, 341 including cutting edges 311*a*, 321*a*, 331*a*, 341*a* of the core wires 311, 321, 331, 341 of the plurality of electric wires 31 to 34 are soldered to the plurality of electrodes 201 to 204, respectively.

According to the second feature, in the cable connection structure 100 as described in the first feature, the electronic component 2 is formed with the plurality of electrodes 201 to 204 on a facing surface (electrode-forming surface) 20 facing the end 300 of the cable 3, the cutting edges 311*a*, 321*a*, 331*a*, 341*a* of the core wires 311, 321, 331, 341 of the plurality of electric wires 31 to 34 and the plurality of electrodes 201 to 204 are aligned in a direction perpendicular to the facing surface 20 at least at a part.

According to the third feature, in the cable connection structure 100 as described in the first feature, the insulators 312, 322, 332, 342 have heat shrinkable property, and the cutting edges 312*a*, 322*a*, 332*a*, 342*a* of the insulators 312, 322, 332, 342 are contracted in the longitudinal direction of the cable 3 with respect to the cutting edges 311*a*, 321*a*, 331*a*, 341*a* of the core wires 311, 321, 331, 341.

According to the fourth feature, in the cable connection structure 100 as described in the first feature or the third feature, the sheath 35 has heat shrinkable property, and a cutting edge 35*a* of the sheath 35 is contracted in the longitudinal direction of the cable 3 with respect to the cutting edges 311*a*, 321*a*, 331*a*, 341*a* of the core wires 311, 321, 331, 341.

According to the fifth feature, in the cable connection structure 100 as described in the first feature, a filler 360 to 364 is arranged in the sheath 35, and the filler 360 to 364 is cut together with the plurality of electric wires 31 to 34 and the sheath 35.

According to the sixth feature, in the cable connection structure 100 as described in the fifth feature, the insulators 312, 322, 332, 342 have heat shrinkable property, and the cutting edges 312*a*, 322*a*, 332*a*, 342*a* of the insulators 312, 322, 332, 342 are contracted in the longitudinal direction of the cable 3 with respect to the cutting edge 360*a*, 361*a*, 362*a*, 363*a*, 364*a* of the filler 360 to 364.

According to the seventh feature, in the cable connection structure 100 as described in the first feature, at least one electric wire 34 among the plurality of electric wires 31 to 34 is different in diameter of the core wire 341 from the other electric wires 31 to 33, and the plurality of electric wires 31 to 34 are not twisted together inside the sheath 35.

According to the eighth feature, in the cable connection structure 100 as described in the seventh feature, an outer peripheral surface 35*b* of the sheath 35 is provided with an index 350 indicating a position of the at least one electric wire 34.

According to the ninth feature, a method of manufacturing a cable connection structure 100 including a cable 3 including a plurality of electric wires 31 to 34 including core wires 311, 321, 331, 341 made of metal conductors are coated with insulators 312, 322, 332, 342, respectively, and a sheath 35 covering the plurality of electric wires 31 to 34, and an electronic component 2 having a plurality of electrodes 201 to 204, the method includes a cutting step of collectively cutting the core wires 311, 321, 331, 341 and the insulators 312, 322, 332, 342 of the plurality of electric wires 31 to 34 and the sheath 35 together perpendicularly to a longitudinal direction of the cable 3, and a connecting step of connecting tip portions of the core wires 311, 321, 331, 341 including cutting edges 311*a*, 321*a*, 331*a*, 341*a* of the core wires 311, 321, 331, 341 of the plurality of electric wires 31 to 34 to the plurality of electrodes 201 to 204, respectively in the state where a cutting edge 3*a* of the cable 3 faces a surface 20 formed with the plurality of electrodes 201 to 204 of the electronic component 2.

According to the tenth feature, in the method for manufacturing the cable connection structure 100 as described in the ninth feature, the connecting step is a step of soldering by blowing hot air H onto a cut end 300 of the cable 3, and the insulators 312, 322, 332, 342 have heat shrinkable property, and the insulators 312, 322, 332, 342 are heated by the hot air H to shrink in a longitudinal direction of the cable 3.

According to the eleventh feature, in the method for manufacturing the cable connection structure 100 as described in the tenth feature, the sheath 35 has heat shrinkable property, and the sheath 35 is heated by the hot air H and shrinks in the longitudinal direction of the cable 3.

Although the first to third embodiments of the present invention have been described above, these embodiments do not limit the invention according to the claims. Also, it should be noted that not all combinations of features described in the embodiments are essential to the means for solving the problems of the invention.

Moreover, the present invention can be modified appropriately without departing from the gist thereof. For example, in the above embodiments, the case where the cable 3 has four electric wires (the first to fourth electric wires 31 to 34) has been described, but the number of electric wires is not limited to this, and may be two, three, or five or more.

In the above embodiments, the case where the cable connection structure 100 including the imaging device 2 as an electronic component is used for the endoscope 10 has been described, but the application use of the cable connection structure 100 is not limited thereto. For example, it is possible to use the cable connection structure 100 for a small electric device having an imaging function. Also, as electronic components, other than the imaging device 2, such as connectors and ICs (integrated circuits) may be used.

The invention claimed is:

1. A cable connection structure, comprising:

a cable comprising a plurality of electric wires comprising core wires composed of metal conductors coated with insulators, respectively, and a sheath covering the plurality of electric wires; and an electronic component including a plurality of electrodes, wherein, in the cable, the core wires and the insulators of the plurality of electric wires and the sheath are collectively cut perpendicularly to a longitudinal direction at an end of the cable, wherein tip portions of the core wires including cutting edges of the core wires of the plurality of electric wires are soldered to the plurality of electrodes, respectively, and wherein the insulators have heat shrinkable property, and the cutting edges of the insulators are contracted in the longitudinal direction of the cable with respect to the cutting edges of the core wires.

2. The cable connection structure, according to claim 1, wherein the electronic component is formed with the plurality of electrodes on a facing surface facing the end of the cable, the cutting edges of the core wires of the plurality of electric wires and the plurality of electrodes are aligned in a direction perpendicular to the facing surface at least at a part.

3. The cable connection structure, according to claim 1, wherein a filler is arranged in the sheath, and the filler is cut together with the plurality of electric wires and the sheath.

4. A cable connection structure, comprising:

a cable comprising a plurality of electric wires comprising core wires composed of metal conductors coated with insulators, respectively, and a sheath covering the plurality of electric wires; and an electronic component including a plurality of electrodes, wherein, in the cable, the core wires and the insulators of the plurality of electric wires and the sheath are collectively cut perpendicularly to a longitudinal direction at an end of the cable, wherein tip portions of the core wires including cutting edges of the core wires of the plurality of electric wires are soldered to the plurality of electrodes, respectively, wherein the sheath has heat shrinkable property, and a cutting edge of the sheath is contracted in the longitudinal direction of the cable with respect to the cutting edges of the core wires.

5. A cable connection structure, comprising:

a cable comprising a plurality of electric wires comprising core wires composed of metal conductors coated with insulators, respectively, and a sheath covering the plurality of electric wires; and an electronic component including a plurality of electrodes, wherein, in the cable, the core wires and the insulators of the plurality of electric wires and the sheath are collectively cut perpendicularly to a longitudinal direction at an end of the cable, wherein tip portions of the core wires including cutting edges of the core wires of the plurality of electric wires are soldered to the plurality of electrodes, respectively, wherein at least one electric wire among the plurality of electric wires is different in diameter of the core wire from the other electric wires, and the plurality of electric wires are not twisted together inside the sheath, and wherein an outer peripheral surface of the sheath is provided with an index indicating a position of the at least one electric wire.

* * * * *